(12) United States Patent
Jian et al.

(10) Patent No.: US 11,016,577 B2
(45) Date of Patent: May 25, 2021

(54) KEYBOARD FOR LIVE STREAMING AND METHOD THEREOF

(71) Applicants: Hao Jian, Guangdong (CN); Feng Lin, Guangdong (CN)

(72) Inventors: Hao Jian, Guangdong (CN); Feng Lin, Guangdong (CN)

(73) Assignee: Shenzhen Ajazz Tongchuang Electronic Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/932,847

(22) Filed: Jul. 20, 2020

(65) Prior Publication Data

US 2020/0348763 A1   Nov. 5, 2020

(51) Int. Cl.
*G06F 3/02* (2006.01)
*G06F 3/044* (2006.01)
*G06F 3/16* (2006.01)
*G06F 3/0354* (2013.01)
*G06F 3/0481* (2013.01)

(52) U.S. Cl.
CPC .......... *G06F 3/0219* (2013.01); *G06F 3/0213* (2013.01); *G06F 3/03545* (2013.01); *G06F 3/044* (2013.01); *G06F 3/162* (2013.01); *G06F 3/165* (2013.01); *G06F 3/04817* (2013.01)

(58) Field of Classification Search
CPC .. G06F 3/0219; G06F 3/0213; G06F 3/03545; G06F 3/044; G06F 3/162; G06F 3/165
See application file for complete search history.

(56) References Cited

U.S. PATENT DOCUMENTS

| | | | | |
|---|---|---|---|---|
| 5,717,430 A | * | 2/1998 | Copland | G06F 3/021 345/168 |
| 7,109,890 B2 | * | 9/2006 | Sim | G06F 3/0219 341/20 |
| 2004/0100447 A1 | * | 5/2004 | Ozolins | G06F 3/021 345/170 |

* cited by examiner

*Primary Examiner* — Priyank J Shah

(57) ABSTRACT

A keyboard for live streaming includes an alphanumeric part including from a plurality of keys including alphanumeric keys, modifier keys, and system commands, a plurality of scissor switches, a frame board, and a PCB; a handwriting screen including a capacitive screen and a capacitive pen configured to move on the capacitive screen for inputting letters or numbers; a function switch including a multimedia button for quickly switching between different operating systems; and an audio input assembly including an earphone port, a capacitor port, a mixer port, an output port, and a MIC port. The audio input assembly can be implemented by a live streaming sound card for stereo, volume, and sound mixing controls.

6 Claims, 5 Drawing Sheets

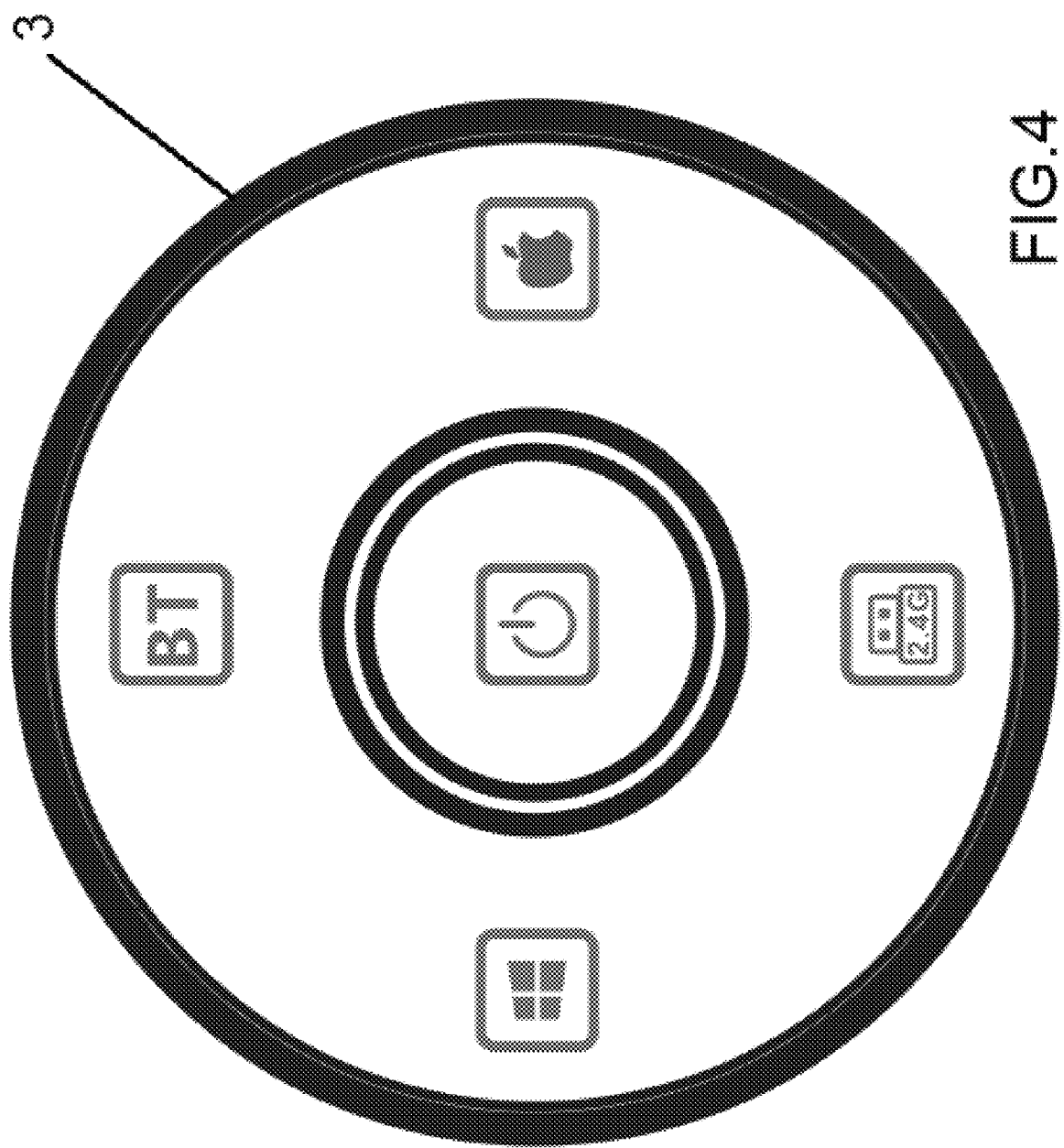
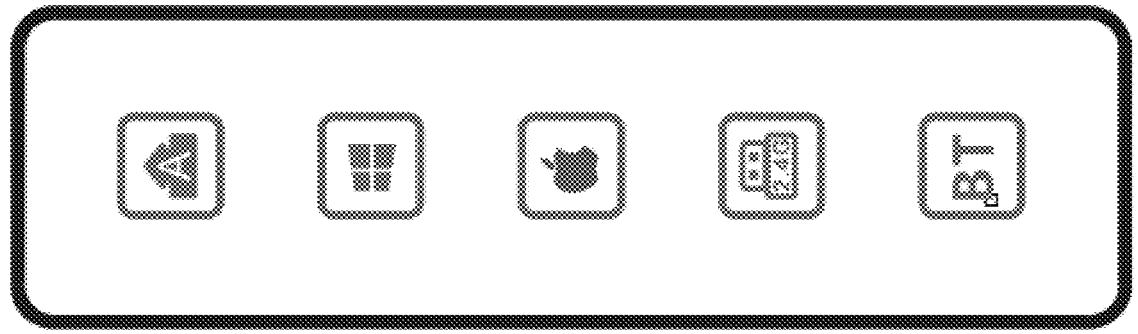
FIG.4

KEYBOARD FOR LIVE STREAMING AND METHOD THEREOF

BACKGROUND OF THE INVENTION

1. Field of the Invention

The invention relates to computer keyboards and more particularly to a keyboard for live streaming and a method of setting up the keyboard.

2. Description of Related Art

Live streaming refers to online streaming media simultaneously recorded and broadcast in real time. Live stream services encompass a wide variety of topics, from social media to video games to professional sports. Platforms such as Facebook Live include the streaming of scheduled promotions and celebrity events as well as streaming between users, as in videotelephony. Sites such as Twitch have become popular outlets for watching people play video games. Coverage of sporting events is a common application.

Live stream setup typically employs a keyboard. However, the computer keyboards are not specially designed for live streaming. Thus, live streamers may encounter great difficulties using the keyboard during live streaming.

Thus, the need for improvement still exists.

SUMMARY OF THE INVENTION

The invention has been made in an effort to solve the problems of the conventional art including great difficulties in use by providing a keyboard for live streaming and a method of setting up the keyboard having novel and non-obvious characteristics.

To achieve above and other objects of the invention, the invention provides a keyboard for live streaming comprising an alphanumeric part including from a plurality of keys, a plurality of scissor switches, a frame board, and a printed circuit board (PCB) wherein the keys include alphanumeric keys, modifier keys, and system commands; a handwriting screen including a capacitive screen and a capacitive pen configured to move on the capacitive screen for inputting letters or numbers; a function switch including a multimedia button for quickly switching between different operating systems; and an audio input assembly including an earphone port, a capacitor port, a mixer port, an output port, and a microphone (MIC) port wherein the audio input assembly is configured to implement by a live streaming sound card for stereo control, volume control, and sound mixing control.

Preferably, the capacitive screen is configured to show icons including my computer, browser, digital board, calculator, handwriting screen, mouse, light control, and live streaming sound card.

Preferably, the capacitive screen allows operations by manipulating a mouse thereon or using a finger to touch it.

Preferably, the multimedia button is configured to light to illuminate a selected function.

Preferably, the stereo control includes handset control and mixing control; the volume control includes high, low, recording, and monitoring; and the sound mixing control includes electronic sound, sound variation, magic sound, explosion sound, and shouting.

Preferably, the capacitive screen includes a TP touch screen on a surface and an internal liquid crystal display (LCD) screen.

The invention has the following advantageous effects in comparison with the prior art: it meets the demand of live streaming. It not only has the features of typical keyboard including input and light but also has the features of typical computer tablet. A person may use the keyboard to implement live streaming. It further has the features of function switching and sound card for live streaming. It makes live streaming easy and simple. It is unique.

The above and other objects, features and advantages of the invention will become apparent from the following detailed description taken with the accompanying drawings.

BRIEF DESCRIPTION OF THE DRAWINGS

FIG. 4 is a greatly enlarged view of the function switch;

DETAILED DESCRIPTION OF THE INVENTION

Figure 1:
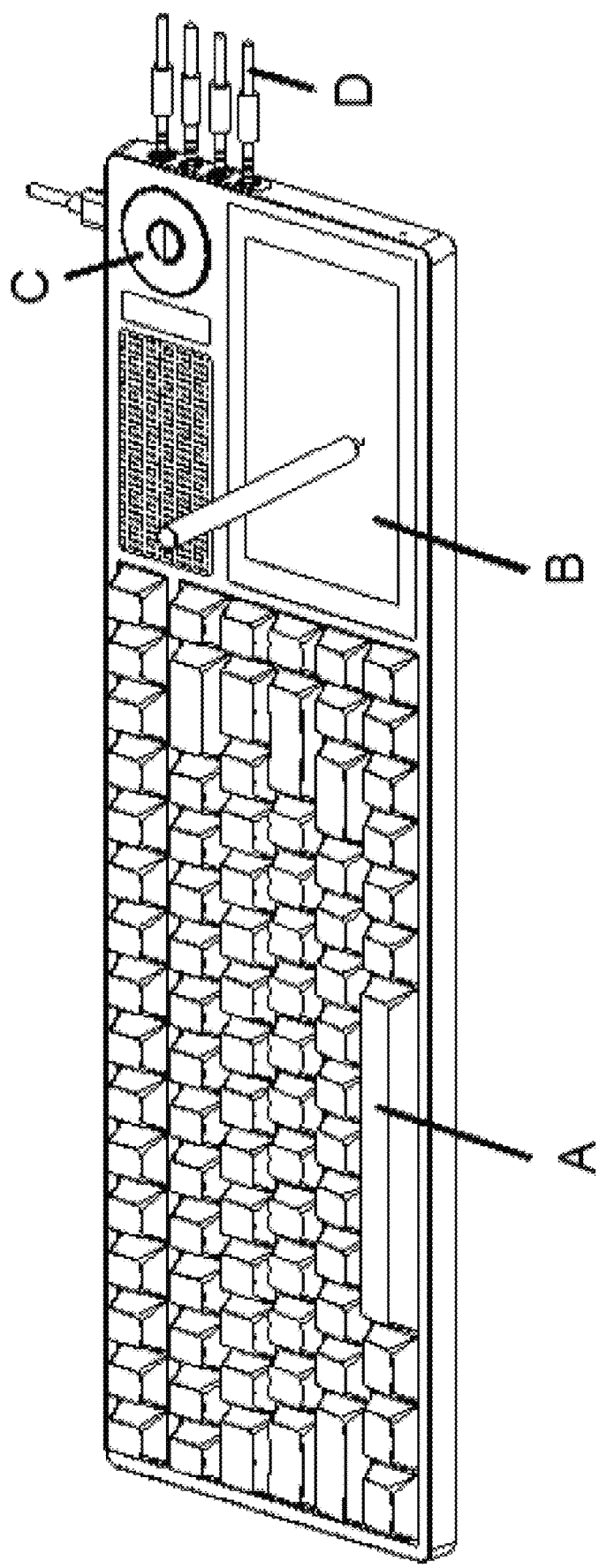
FIG. 1 is a perspective view of a keyboard for live streaming according to the invention.
Figure 2:
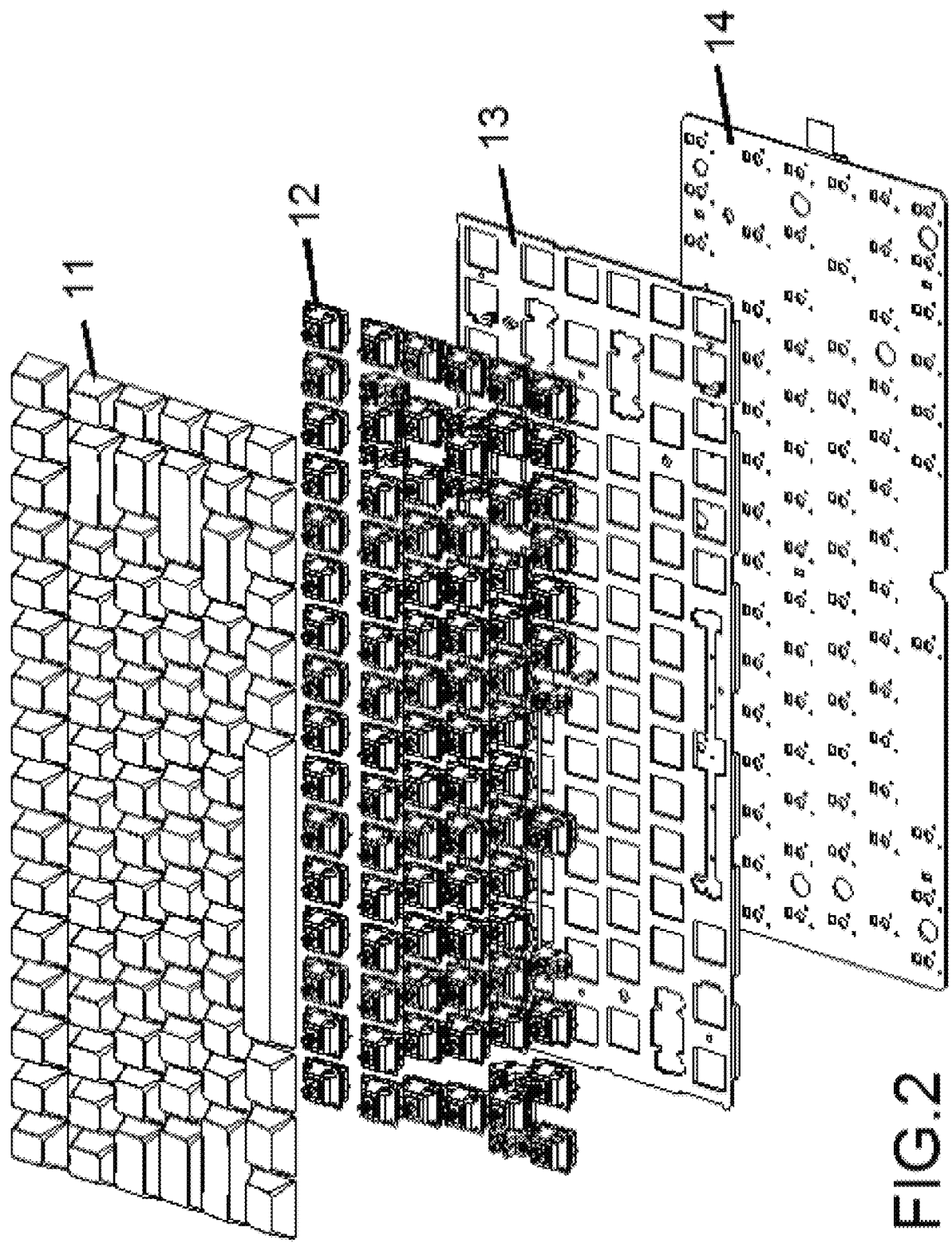
FIG. 2 is an exploded view of the alphanumeric part.
Figure 3:
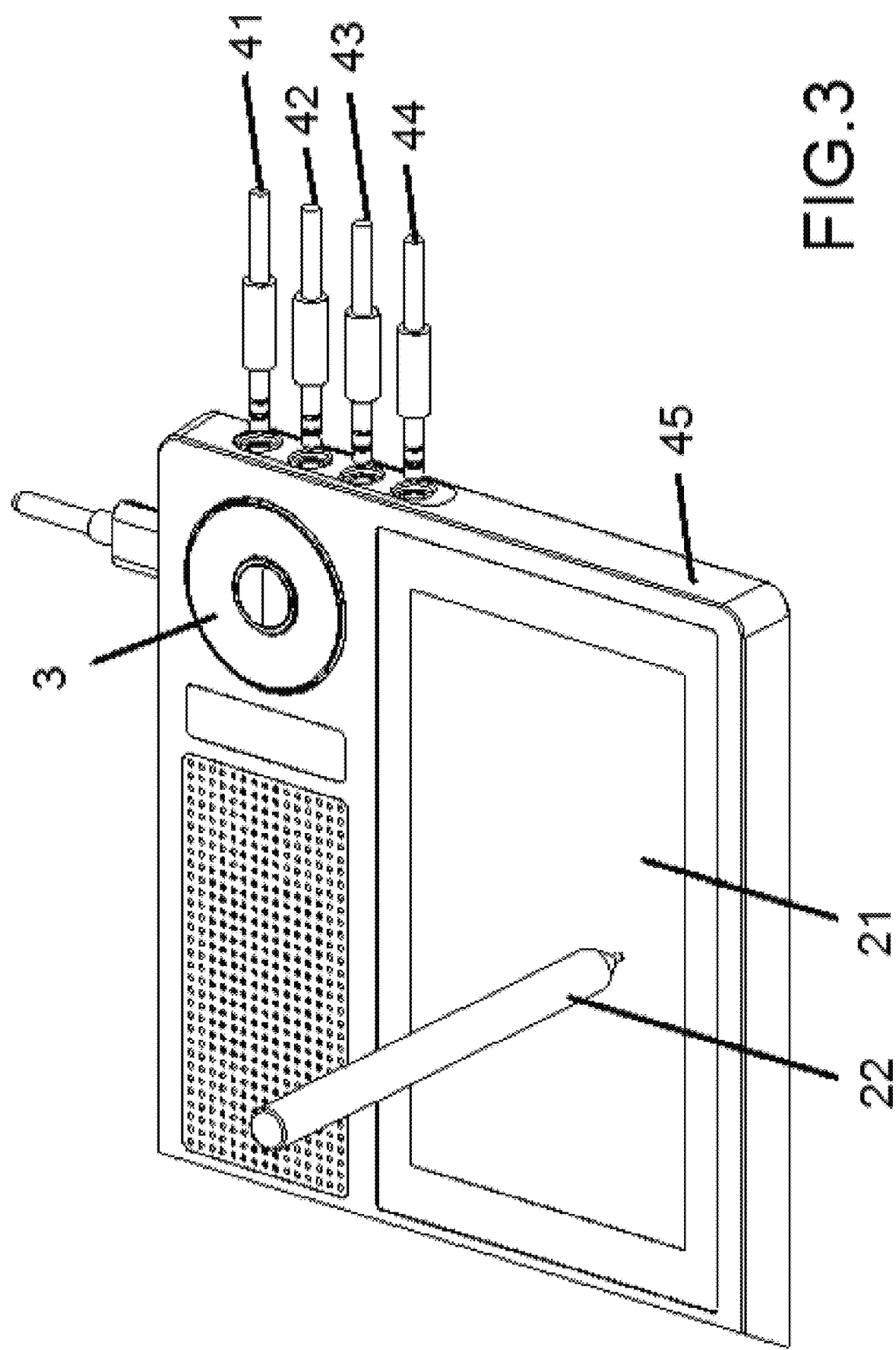
FIG. 3 is a perspective view of the handwriting screen, the function switch and the audio input assembly.

Referring to FIGS. 1 to 4, a keyboard for live streaming accordance with the invention comprises the following components as discussed in detail below.

Alphanumeric part A includes from top to bottom, a plurality of keys 11 including alphanumeric keys, modifier keys, system commands, etc., a plurality of scissor switches 12, a frame board 13, and a printed circuit board (PCB) 14. The keys 11 of the alphanumeric part A are made of polybutylene terephthalate (PBT) and have the characteristics of being durable and non-sticky. The sensitivity of the keys is controlled at a weight range of ±3 g. The frame board 13 is made of galvanized sheet metal and is highly resistant to corrosion. The number of the keys 11 is either 87 or 104. All function keys of the 84-key and the 104-key keyboards are included in the 84-key keyboard of the invention. Combination keys are implemented by FN+. The keys 11 are red-green-blue (RGB) lit. The keys 11 are quiet in operation.

A handwriting screen B is provided to the right of the alphanumeric part A. A capacitive pen 22 may move on a capacitive screen 21 to input letters or numbers. Other functions are also made possible by moving the capacitive pen 22.

Figure 6:
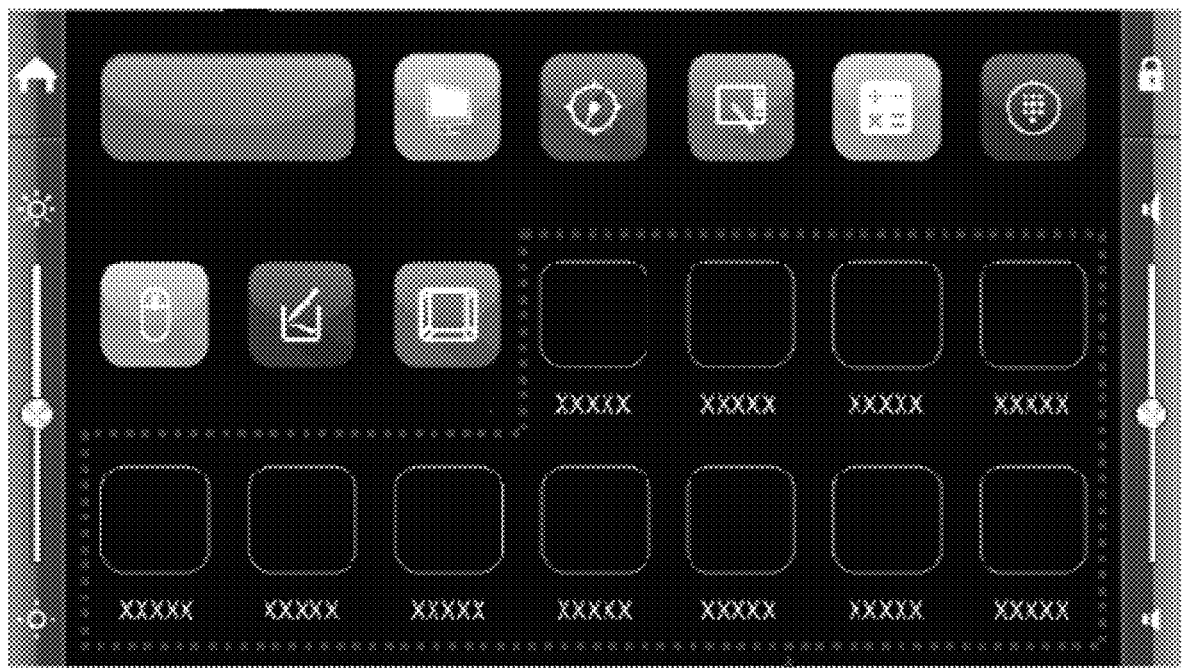
FIG. 6 schematically depicts what is further shown on the capacitive screen.

As shown in FIG. 6 specifically, a function switch C is provided to the top of the handwriting screen B and includes a disc-shaped multimedia button 3 for quickly switching between Windows and Mac applications or Bluetooth® and 2.4G wireless or wired applications. The results are shown on a monitor.

An audio input assembly D is provided at the right side and includes an earphone port 41, a capacitor port 42, a mixer port 43, an output port 44 and a microphone (MIC) port 45. The audio input assembly D can be implemented by a live streaming sound card which has the features of stereo control, volume control and sound mixing control.

Figure 5:
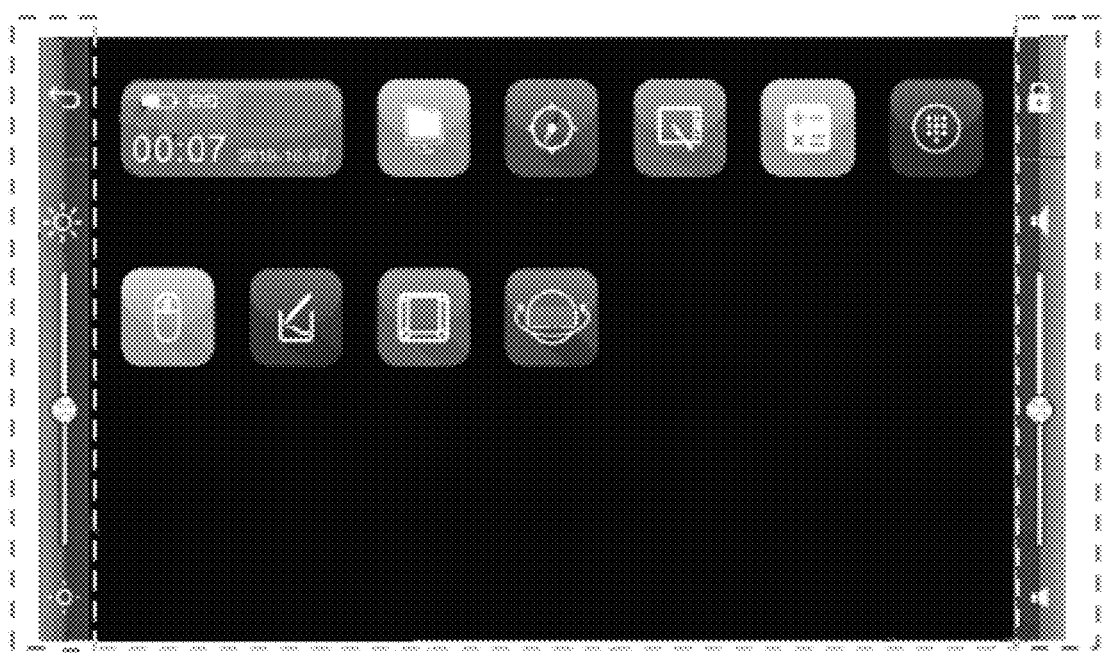
FIG. 5 schematically depicts what is shown on the capacitive screen.

Referring to FIGS. 5 and 6 in conjunction with FIGS. 1 to 4, the capacitive screen 21 is adapted to show icons of, from top left to top right and to next line, date/time, my computer, browser, digital board, calculator, keypad, mouse, handwriting screen, light control and live streaming sound card.

There are margin zones in the left and right sides of the screen with icons of return, lock, brightness and loudspeaker. A blue bar is provided in either side and may flash when at least one of brightness and sound volume is increased. Additional icons are also provided on the screen.

Preferably, the capacitive screen 21 allows operations by manipulating a mouse thereon or using a finger to touch it.

Preferably, the multimedia button 3 may light to illuminate the function being selected by a user.

Preferably, the stereo control includes handset control and mixing control. The volume control includes high, low, recording and monitoring. The sound mixing control includes electronic sound, sound variation, magic sound, explosion sound and shouting.

Preferably, the capacitive screen 21 includes an internal liquid crystal display (LCD) screen and a twisted pair (TP) touch screen on the surface.

A method of setting up the keyboard for live streaming in accordance with the invention comprises the steps of (1) installing the alphanumeric part A by mounting adjusted mechanical axes and satellite axes on the frame board 13, mounting the frame board 13 on the PCB 14 which has been subjected to SMT, securing them together by soldering, testing the half-finished product, mounting other components including base on the half-finished product, mounting keys on the half-finished product, electrically testing the half-finished product, and subjecting the half-finished product to automated optical inspection (AOI); (2) installing the handwriting screen B by mounting the LCD screen in the capacitive screen 21, mounting the TP touch screen on the capacitive screen 21, testing the capacitive screen 21, securing the capacitive screen 21 to the alphanumeric part A, and testing the secured capacitive screen 21 and the alphanumeric part A; (3) installing the function switch C by securing the function switch C to the assembled alphanumeric part A and the handwriting screen B; and (4) installing the audio input assembly D by securing the audio input assembly D to the assembled alphanumeric part A, the handwriting screen B, and the function switch C so that a keyboard for live streaming is finished.

It is noted that the half-finished product includes a light member for illuminating the keys 11. The light member has an RGB effect and brightness adjustment of the light member is implemented by manipulating a number of modifier keys at the same time is a manner similar to FN+.

The invention has the following advantageous effects in comparison with the prior art: it meets the demand of live streaming. It not only has the features of typical keyboard including input and light but also has the features of typical computer tablet. A person may use the keyboard to implement live streaming. It further has the features of function switching and sound card for live streaming. It makes live streaming easy and simple. It is unique.

While the invention has been described in terms of preferred embodiments, those skilled in the art will recognize that the invention can be practiced with modifications within the spirit and scope of the appended claims.

What is claimed is:

1. A keyboard for live streaming, comprising:
    an alphanumeric part including from a plurality of keys, a plurality of scissor switches, a frame board, and a printed circuit board (PCB) wherein the keys include alphanumeric keys, modifier keys, and system commands;
    a handwriting screen including a capacitive screen and a capacitive pen configured to move on the capacitive screen for inputting letters or numbers;
    a function switch including a multimedia button for quickly switching between different operating systems; and
    an audio input assembly including an earphone port, a capacitor port, a mixer port, an output port, and a microphone (MIC) port wherein the audio input assembly is configured to implement by a live streaming sound card for stereo control, volume control, and sound mixing control.

2. The keyboard for live streaming of claim 1, wherein the capacitive screen is configured to show icons including my computer, browser, digital board, calculator, handwriting screen, mouse, light control, and live streaming sound card.

3. The keyboard for live streaming of claim 1, wherein the capacitive screen allows operations by manipulating a mouse thereon or using a finger to touch it.

4. The keyboard for live streaming of claim 1, wherein the multimedia button is configured to light to illuminate a selected function.

5. The keyboard for live streaming of claim 1, wherein the stereo control includes handset control and mixing control; the volume control includes high, low, recording, and monitoring; and the sound mixing control includes electronic sound, sound variation, magic sound, explosion sound, and shouting.

6. The keyboard for live streaming of claim 1, wherein the capacitive screen includes a twisted pair (TP) touch screen on a surface and an internal liquid crystal display (LCD) screen.

* * * * *